United States Patent [19]

Shinpuku

[11] Patent Number: 5,148,333
[45] Date of Patent: Sep. 15, 1992

[54] METHOD FOR RECORDING AND/OR REPRODUCING A SIGNAL

[75] Inventor: Yoshihide Shinpuku, Kanagawa, Japan

[73] Assignee: Sony Corp., Japan

[21] Appl. No.: 449,001

[22] Filed: Dec. 12, 1989

[30] Foreign Application Priority Data

Dec. 21, 1988 [JP] Japan .................. 63-322699
May 9, 1989 [JP] Japan .................. 1-115786
May 29, 1989 [JP] Japan .................. 1-135007

[51] Int. Cl.⁵ ........................................ G11B 5/09
[52] U.S. Cl. ............................................ 360/40
[58] Field of Search ............... 360/40, 39; 341/57, 341/46

[56] References Cited

U.S. PATENT DOCUMENTS

| | | | |
|---|---|---|---|
| 4,482,927 | 11/1984 | Melbye et al. | 360/40 |
| 4,506,252 | 3/1985 | Jacoby et al. | 360/40 |
| 4,563,806 | 1/1986 | Coissard et al. | 29/571 |
| 4,566,044 | 1/1986 | Langdon, Jr. et al. | 360/40 |
| 4,663,767 | 5/1987 | Voegeli | 360/40 |
| 4,885,646 | 12/1989 | Kanota et al. | 360/40 |
| 4,970,609 | 11/1990 | Cunningham et al. | 360/46 |

FOREIGN PATENT DOCUMENTS

| | | | |
|---|---|---|---|
| 0103523 | 9/1983 | European Pat. Off. | 21/84 |
| 1164488 | 3/1964 | Fed. Rep. of Germany . | |
| 2901171 | 7/1979 | Fed. Rep. of Germany . | |

OTHER PUBLICATIONS

Conference Record of the International Display Research Conference, San Diego, Oct. 15-17, 1985, pp. 30-31, Institute of Electrical and Electronics Engineers, Inc., New York, U.S.; T. Sakai et al.: "A color LC panel using a very thin film transistor (V-TFT)", p. 30, left-hand column, paragraph 2.

Primary Examiner—Vincent P. Canney
Attorney, Agent, or Firm—Ronald P. Kananen

[57] ABSTRACT

A method for recording and/or reproducing a signal in which three regions of a magnetization region in which magnetization is effected in a certain direction, a magnetization direction in which magnetization is effected in the opposite direction to that of the former region and a random magnetization region in which magnetization is effected randomly are arranged on a recording medium and digital data are recorded in correspondence with the three regions. Upon reproduction, a calculation is effected by using a reproduced signal and an isolated waveform information derived from the recording medium, thereby obtaining anticipated data whose most likelihood value is high, and this anticipated data is employed as detected data. Accordingly, a large reproduced output can be obtained in accordance with the change of magnetization, and freedom of the code itself can be increased, thereby improving the recording linear density as compared with the prior art.

6 Claims, 15 Drawing Sheets

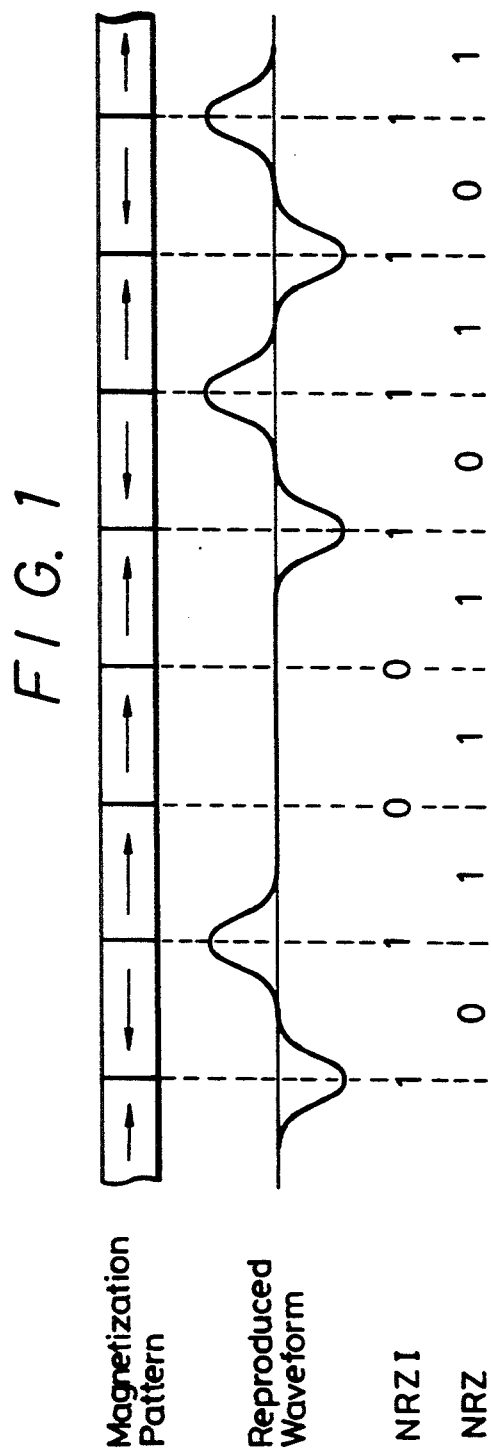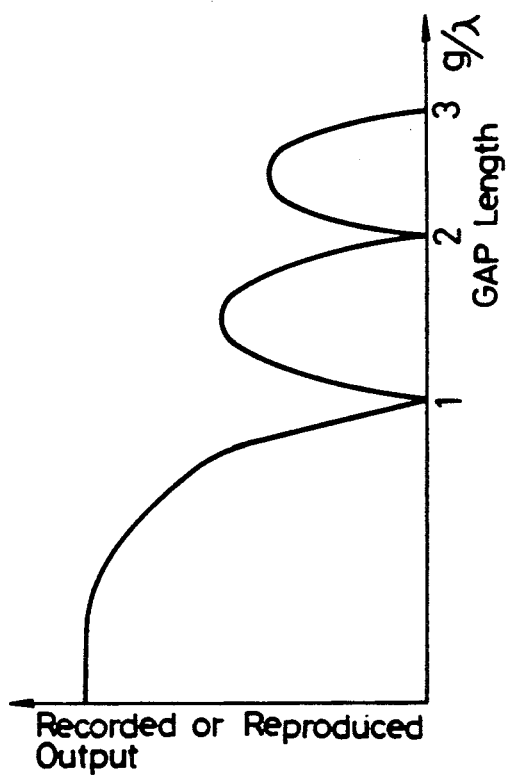

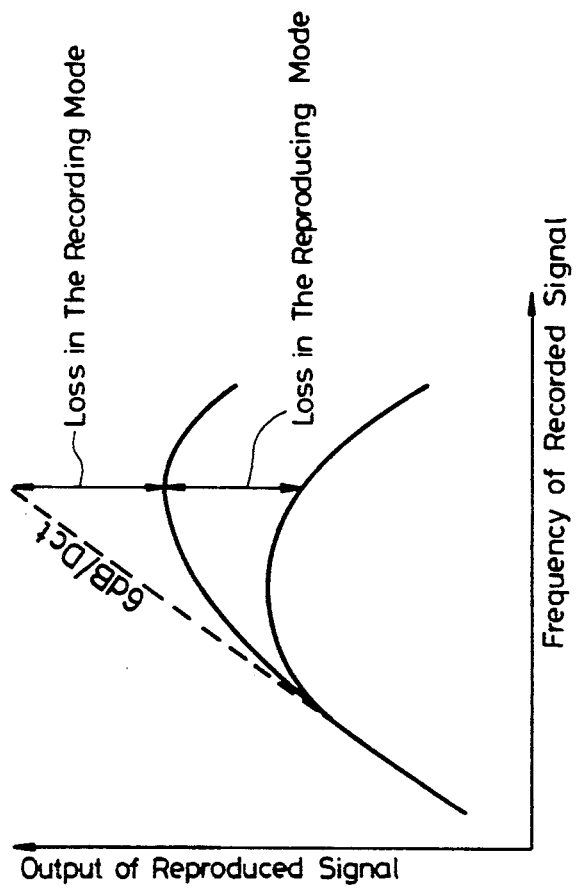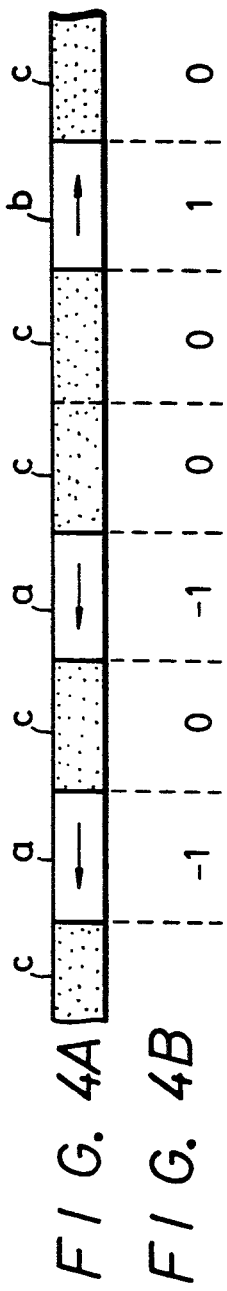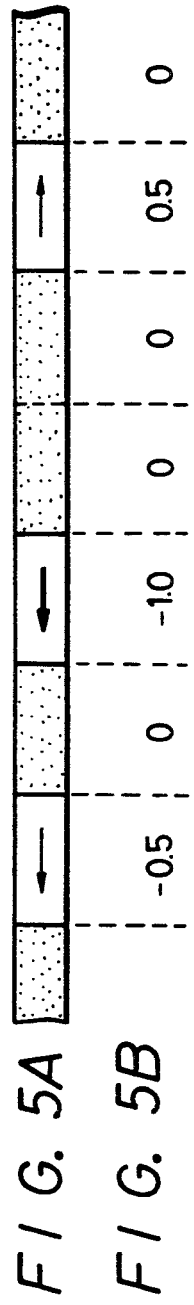

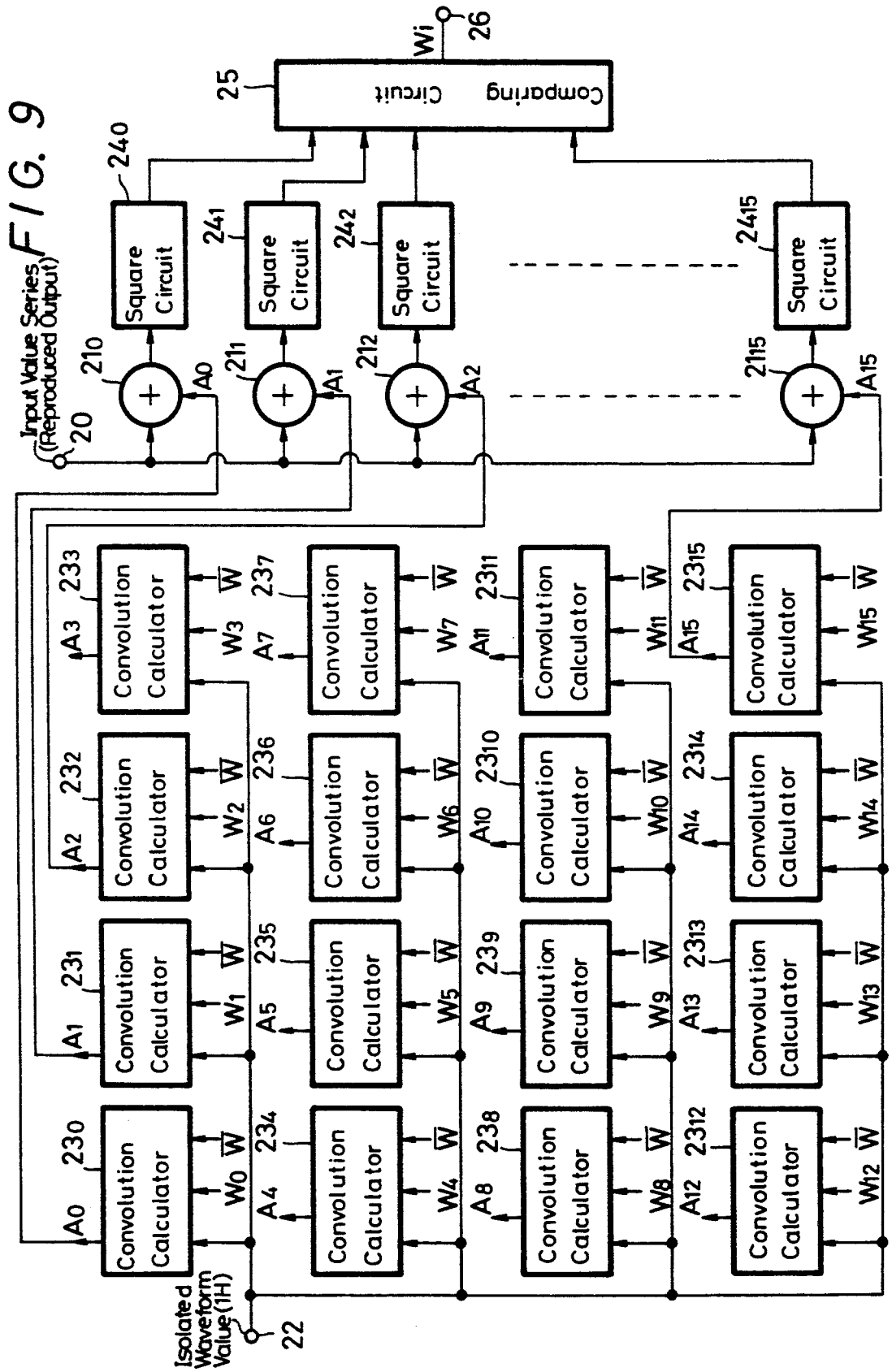

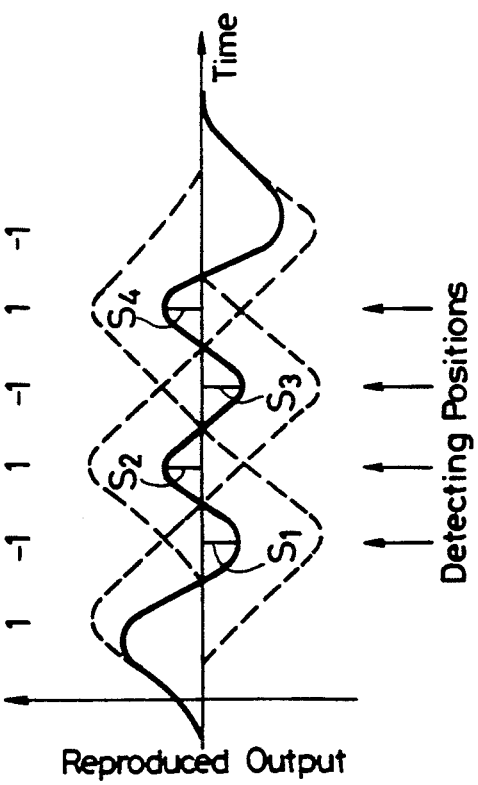
FIG. 18
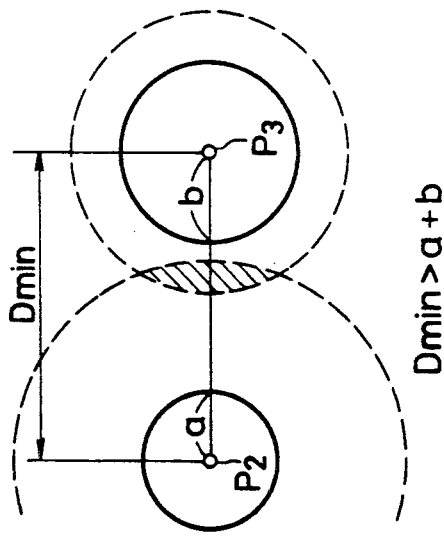
FIG. 16
FIG. 17

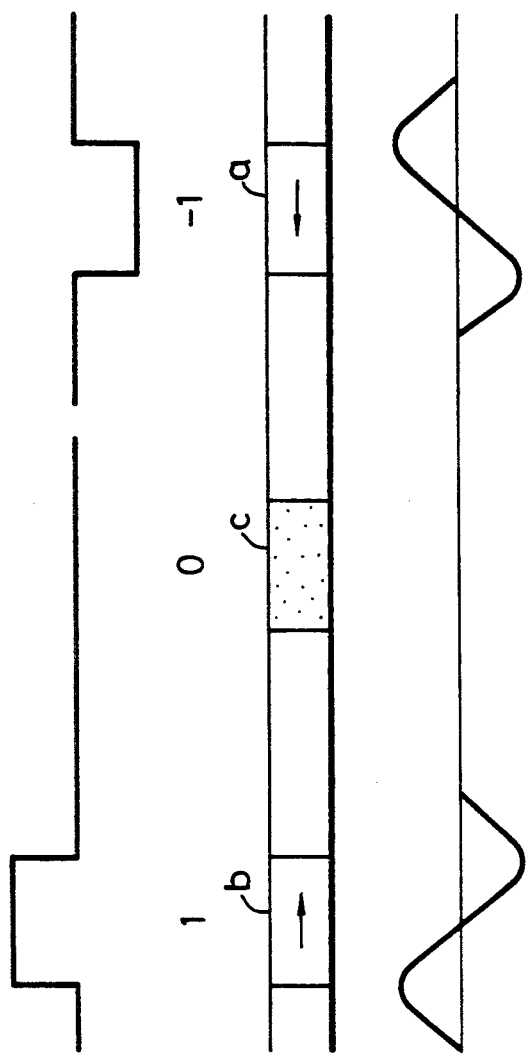
F I G. 21A Recorded Signal
F I G. 21B Code
F I G. 21C Magnetized State
F I G. 21D Reproduced Output
F I G. 21E Sampling
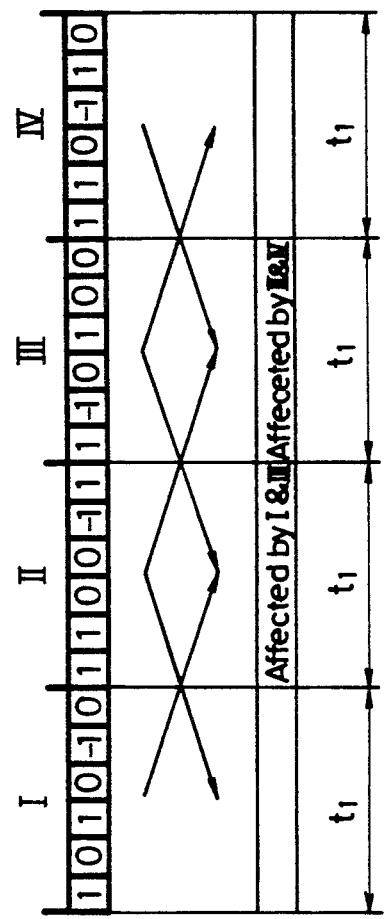
F I G. 22

| Compared Results | Definite Values ($Q_0, R_0$) | Return Values ($\overline{Q}_0, \overline{R}_0$) |
|---|---|---|
| $Z_1 \leq Z_2$ | $W_{A10}$<br>$L_{A10}$ | $\overline{W}_{A11}, \overline{W}_{A21}$<br>$L_{A11}, L_{A21}$ |
| $Z_2 < Z_1$ | $W_{A20}$<br>$L_{A20}$ | $\overline{W}_{B11}, \overline{W}_{B21}$<br>$L_{B11}, L_{B21}$ |
| | Definite Data<br>Definite Likelihood Value | To be Transmitted to The Next Detecting Block |

| Compared Results | Definite Values ($Q_i$, $R_i$) | Return Values ($\bar{Q}_i$, $\bar{R}_i$) |
|---|---|---|
| $Z_1 < Z_2$ | $W_{A1(i-1)}$<br>$L_{A1(i-1)}$ | $\bar{W}_{A1i}, \bar{W}_{A2i}$<br>$L_{A1i}, L_{A2i}$ |
| $Z_2 < Z_1$ | $W_{A2(i-1)}$<br>$L_{A2(i-1)}$ | $\bar{W}_{B1i}, \bar{W}_{B2i}$<br>$L_{B1i}, L_{B2i}$ |
|  | Definite Data<br>Definite Likelihood Value | To be Transmitted to The Next Detecting Block |

METHOD FOR RECORDING AND/OR REPRODUCING A SIGNAL

BACKGROUND OF THE INVENTION

1. Field of the Invention

The present invention relates generally to methods for recording and/or reproducing digital data and, more particularly, is directed to a method for recording digital data on a recording medium in high packing density and/or reproducing the recorded digital data from the recording medium.

2. Description of the Prior Art

When a digital signal is recorded on a magnetic recording medium, it is proposed that a binary digital signal of "1" or "0" is made corresponding to a magnetization inverted layer according to a nonreturn to zero inverted (NRZI) method or that a digital signal is made corresponding to different polarities according to a nonreturn to zero (NRZ) method.

FIG. 1 schematically illustrates the magnetization condition and the corresponding codes according to the prior-art recording method. It is clear from FIG. 1 that the binary digital signal of "1" or "0" is made corresponding to the magnetization inverted layer according to the NRZI method and that the digital signal is made corresponding to the different polarities according to the NRZ method.

In these known methods, if the signal, which repeats "1" and "0", is frequently recorded, then the level of the reproduced output is lowered by a gap loss caused by the gap length of the reproducing head, a spacing loss caused by the distance between the recording medium and the magnetic head, and so on. In the digital recording and/or reproducing apparatus which is now commercially available on the market, the packing density value is determined by the output carrier-to-noise ("C/N") ratio of the maximum repetitive frequency of a pattern to be recorded.

In the recording method according to the prior art, a region having a magnetization vector in a certain direction is always accompanied with the adjacent region having a magnetization of opposite polarity. If the region of the same length is repeated, then a signal of a single cycle is recorded. FIG. 2 shows a relationship between a gap length and a recorded or reproduced output where the recorded or reproduced output is plotted while changing the cycle. In FIG. 2, the gap length (g) per wavelength ($\lambda$) of the repeated signal is indicated on the abscissa and the recorded or reproduced output is indicated on the ordinate. It is to be understood from FIG. 2 that the output level is rapidly lowered when the wavelength ($\lambda$) of the cycle signal approaches the gap. This determines the limit of the packing density.

Further, if the packing density is increased in the binary modulation code, the maximum repetitive frequency after being modulated is increased, and the deterioration of signal arises as shown in FIG. 3, thus frequently causing mis-detection. Alternatively, non-linear intersymbol interference, called a peak-shift, occurs due to influences other than a head magnetic field, such as a self-demagnetizing force, a mutual action of magnetic particle itself, and so forth. The interference acts to determine a residual magnetization so that recorded data can not be detected.

A loss in the recording mode is, for example, recording demagnetization, separation loss caused by the fact that the tape is distant apart from the head, thickness loss caused by the tape thickness, self-demagnetization loss occurring in the tape, and the like, whereas a loss in the reproducing mode is a gap loss, a separation loss, an azimuth loss and the like.

As described above, it was intended to increase the packing density by the use of the binary modulation code. However, various losses occur in the recording and reproducing modes so that the increase of the packing density depends on the enhancement of efficiency of the magnetic medium and the magnetic head. Therefore, it is difficult to increase the packing density satisfactorily.

OBJECTS AND SUMMARY OF THE INVENTION

Accordingly, it is a general object of the present invention to provide an improved method for recording and/or reproducing a digital signal.

More specifically, it is an object of the present invention to provide a method for recording and/or reproducing a digital signal in high density.

It is another object of the present invention to provide a method for recording and/or reproducing a digital signal with high reliability.

According to an aspect of the present invention, there is provided a method for recording digital data comprising the steps of:

arranging on a recording medium three regions of a magnetization region in which a magnetization is made in a certain direction, a magnetization region in which a magnetization is effected in the opposite direction to the former region, and a random magnetization region in which the magnetization is effected randomly; and recording digital data in correspondence with said three kinds of regions.

According to another aspect of the present invention, there is provided a method for reproducing digital data in which three regions of a magnetization region in which a magnetization is made in a certain direction, a magnetization region in which a magnetization is effected in the opposite direction to the former region, and a random magnetization region in which the magnetization is effected randomly are arranged on a recording medium and digital data recorded in correspondence with said three kinds of regions are reproduced, comprising the steps of:

effecting the calculation by using a reproduced signal and an isolated waveform information from said recording medium;

calculating anticipated data having a higher likelihood; and employing said anticipated data as detected data.

The above, and other objects, features and advantages of the present invention, will be apparent from the following detailed description of preferred embodiments when read in conjunction with the accompanying drawings, in which like reference numerals are used to identify the same or similar parts in the several views.

BRIEF DESCRIPTION OF THE DRAWINGS

FIG. 1 is a schematic diagram showing a magnetization state and corresponding codes according to the prior art;

FIG. 2 is a schematic representation of a head gap length and a recorded and/or reproduced output, and to which reference will be made in explaining the prior-art method;

FIG. 3 is a schematic representation of a relationship between a frequency of a recorded signal and an output of a reproduced signal, and to which reference will be made in explaining the method according to the prior art;

FIGS. 4A and 4B are schematic diagrams showing an example of a magnetization state and corresponding codes, respectively;

FIGS. 5A and 5B are schematic diagrams showing another example of a magnetization state and corresponding codes, respectively;

FIG. 9 is a block diagram showing a main portion of one embodiment of the present invention of FIG. 8;

FIG. 16 is a schematic diagram to which reference will be made in explaining a minimum distance between the patterns;

FIG. 17 is a graphical representation to which reference will be made in explaining the operation in which signal level is detected in units of bits according to the prior art;

FIGS. 18 and 19 are tables showing examples of converted codes included in the present invention;

FIG. 20 is a graphical representation to which reference will be made in explaining a relationship between the packing density and the error rate;

FIGS. 21A to 21E are schematic diagrams of signal waveforms of recorded and reproduced signals, and to which reference will be made in explaining the operation of the present invention;

FIG. 22 is a schematic representation showing the condition of the intersymbol interference;

DETAILED DESCRIPTION OF PREFERRED EMBODIMENTS

Figure 6:
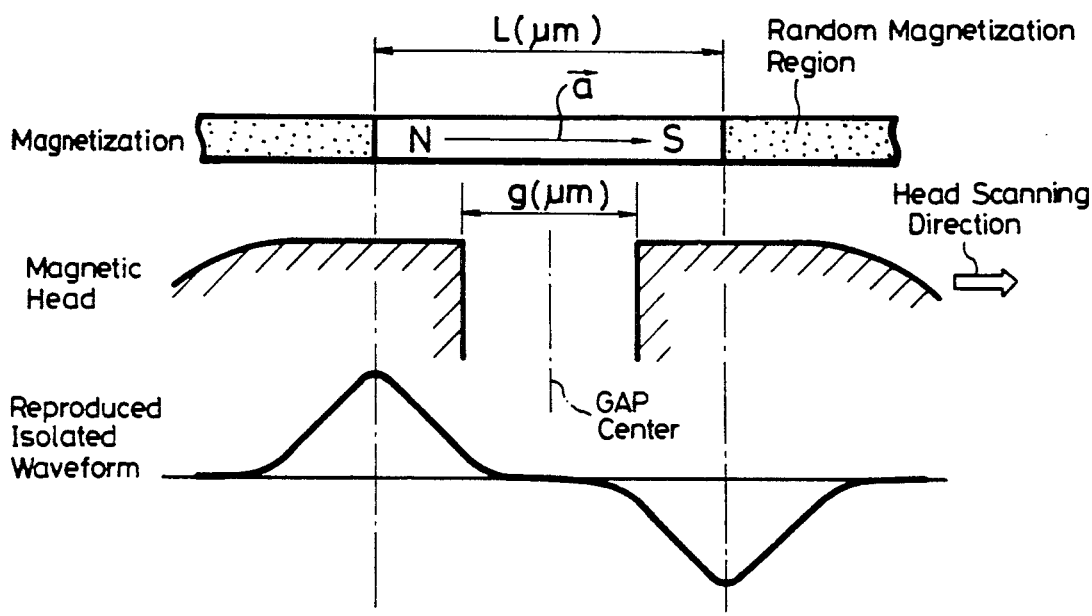
FIGS. 6 and 7 are schematic diagrams to which reference will be made in explaining a relationship among the length of magnetization, the gap length of the magnetic head, and the reproduced isolated waveform according to the present invention.

Referring to the drawings, and initially to FIGS. 4 to 7, a fundamental principle of the present invention will be described in order to gain a better understanding of the present invention.

FIGS. 4A and 4B illustrate an example of a corresponding relationship between a magnetization state and a code in the case of a ternary digital value according to the present invention. In this invention, let us consider, in addition to regions of magnetization vectors shown by arrows a and b in FIG. 4A, a region in which the magnetization direction is randomly presented as shown by a letter c in FIG. 4A. The region c in which the magnetization direction is randomly presented does not always mean a degaussed condition, and it means the place where the length of region magnetized in one direction is less than half of the length of the head gap and two or more magnetization direction inverting regions are presented. Then, the codes are recorded in these regions as shown in FIG. 4B. For example, a code "−1" is recorded in correspondence with the region of magnetization vector shown by the arrow a, a code "1" is recorded in correspondence with the region of magnetization vector shown by the arrow b, and a code "0" is recorded in correspondence with the random magnetization region shown by the letter c, respectively.

FIGS. 5A and 5B illustrate an example of a corresponding relationship between a magnetization state and a code in the case of a quinary digital value according to an enlarged system of the above-noted ternary system. In FIG. 5B, values "1.0 (not shown)", "0.5", "−0.5" and "−1.0" are different in magnitude of magnetization. By changing the magnitude of the magnetization vectors in the enlarged system, multi-value codes such as ternary, quinary, septenary and the like can be associated with the respective regions, whereby the magnetization can be changed in a range of wide variety. Thus, it is possible to increase the freedom of the code. In the case of the ternary digital signal, the improvement of the packing line density can be expected as follows.

Improvement of recording line density = (1)

$$\frac{\log_{10}3}{\log_{10}2} \times 2.5 \approx 4.0 \text{ times}$$

where $\log_{10}3$ represents a code efficiency of ternary digital value, $\log_{10}2$ represents a code efficiency of binary digital value and 2.5 represents the experimental value. This experimental value represents the value in which the existing head can provide the changed amount of the magnetization. According to this experimental value, the magnetization vector can be reduced relative to the prior-art recording system. There is then a possibility that this experimental value can be increased more when being optimized to the system of the present invention.

As described above with reference to FIG. 2, according to the prior-art recording system, when the wavelength of the frequency signal reaches near the head gap, the output is abruptly lowered, which determines the limit of the packing density. However, it is to be noted that the output is not lowered because the magnitude of the magnetization vector is small. By way of example, let us consider a case that as shown in FIGS. 6 and 7, a magnetization vector a oriented in a certain direction is isolated in a region in which the magnetization direction is randomly presented.

Figure 7:
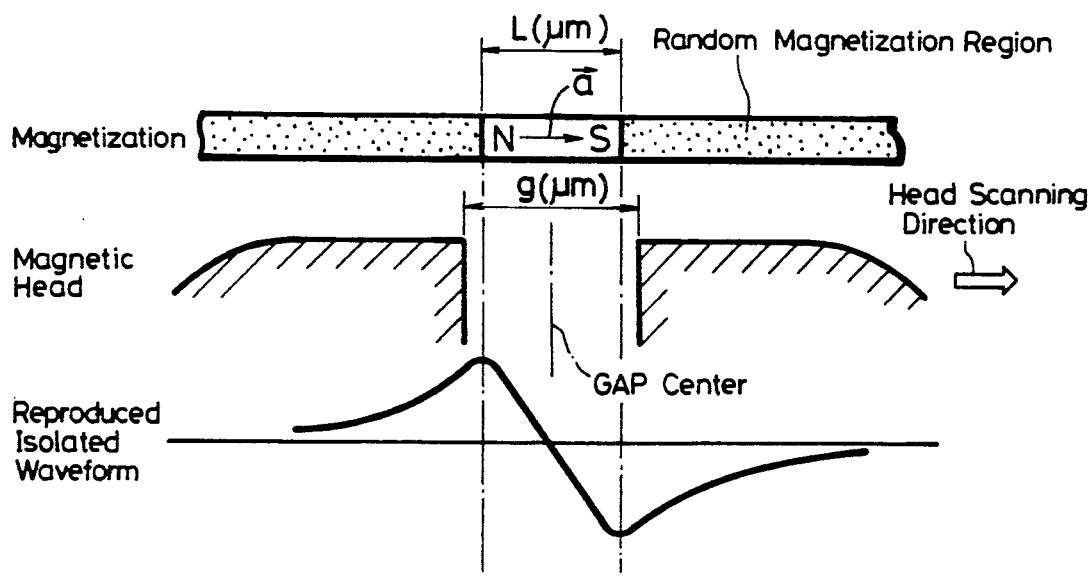

FIG. 6 shows a case in which a magnetization length L is larger than the gap length g, whereas FIG. 7 shows a case in which the magnetization length L is smaller than the gap length g. In both cases, when the head gap passes the top end portion and the rear end portion of the magnetization vector a, a current corresponding to the change of magnetization flows through the winding of the head, thus making it possible to detect the existence and polarity of magnetization vector. In other words, it is possible to detect three kinds of magnetization regions. A reproduced waveform, detected at that time, is referred to as an isolated waveform, and this isolated waveform can be regarded as a response waveform of a single magnetization magnetized in a certain direction. According to this invention, definite reproduced data is obtained by using the isolated waveform as will be described later. In order to obtain the isolated waveform, it is necessary to record an impulse waveform in, for example, a starting portion of a tape prior to the recording of ordinary data upon recording.

Figure 8:
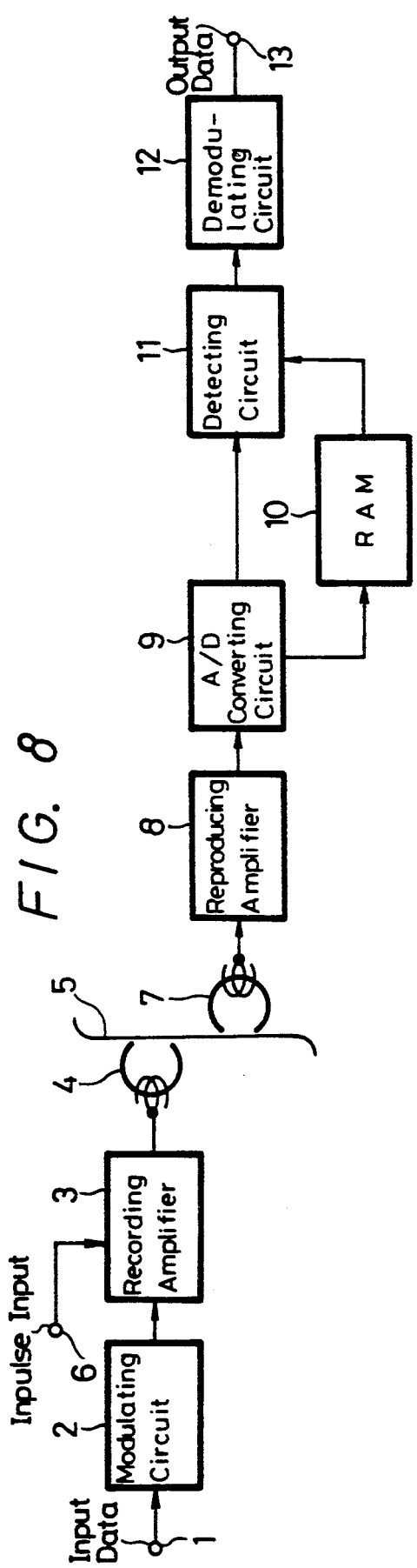
FIG. 8 is a block diagram showing a circuit which embodies a method for recording and/or reproducing a signal according to an embodiment of the present invention.

An embodiment of the present invention will be described with reference to FIGS. 8 to 12. FIG. 8 is a block diagram showing an arrangement of the embodiment of the present invention.

In FIG. 8, it will be seen that input data (generally, a binary signal) is applied to an input terminal 1 as a signal to be recorded. The input data applied to the input terminal 1 is supplied to a modulating circuit 2, in which it is converted to a multi-value (more than ternary) signal which provides a large change of magnetization. The multi-value signal, converted by the modulating circuit 2, is amplified by an amplifier 3 and recorded on a magnetic tape 5 by a recording head 4 as, for example, shown in FIG. 4A. If the above-noted signal is recorded in the region in which the magnetization is randomly presented, then the recording head 4 will not be excited by a current and a potential difference across the coil is made zero or if the above-mentioned signal is recorded in a region in which the magnetization direction is not randomly presented, then the coil of the recording head 4 will magnetize the region by a high frequency having a cycle more than twice that of other magnetization region.

A signal having an impulse waveform is supplied from a terminal 6 to the recording amplifier 3 in order to record the above-mentioned isolated waveform in, for example, the starting portion of the magnetic tape 5 before the input data is recorded in the magnetic tape 5 as described above.

Upon reproducing, a reproduced signal is reproduced from the magnetic tape 5 by a reproducing head 7, and is supplied to a playback amplifier 8, in which it is amplified and corrected so as to have a flat frequency characteristic. The signal from the playback amplifier 8 is supplied to an analog-to-digital (A/D) converting circuit 9, and is thereby converted to a digital signal. Then, a value of the reproduced isolated waveform (isolated waveform value) corresponding to the impulse waveform recorded prior to the input data as shown in FIG. 10 is stored in a random access memory (RAM) 10. This reproduced isolated waveform corresponds to a code in which no intersymbol interference occurs, i.e., a code in which sampling intervals 0 to 16 correspond to [1000, 0000, 0000, 0000].

The reproduced data thus A/D-converted by the A/D converter 9 is also supplied to a detecting circuit 11. The detecting circuit 11 performs, when detecting data in units of, for example, 4 bits, the detection of data in accordance with the following equation:

$$L = W * H - Y \qquad (2)$$

$$= \begin{pmatrix} W_0 & W_1 & W_2 & W_3 \\ W_{-1} & W_0 & W_1 & W_2 \\ W_{-2} & W_{-1} & W_0 & W_1 \\ W_{-3} & W_{-2} & W_1 & W_0 \end{pmatrix} \begin{pmatrix} H_3 \\ H_2 \\ H_1 \\ H_0 \end{pmatrix} - \begin{pmatrix} Y_0 \\ Y_1 \\ Y_2 \\ Y_3 \end{pmatrix}$$

Figure 10B:
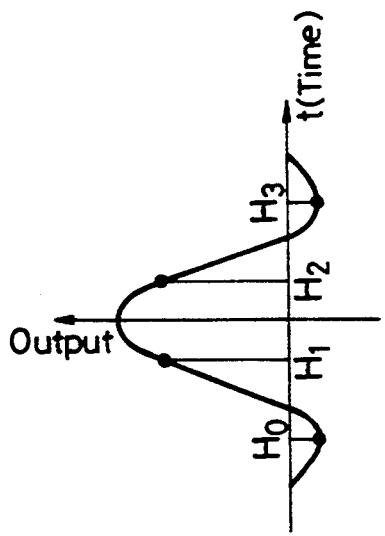
FIG. 10B is a schematic diagram showing an example of an isolated waveform used in the present invention.
Figure 10A:
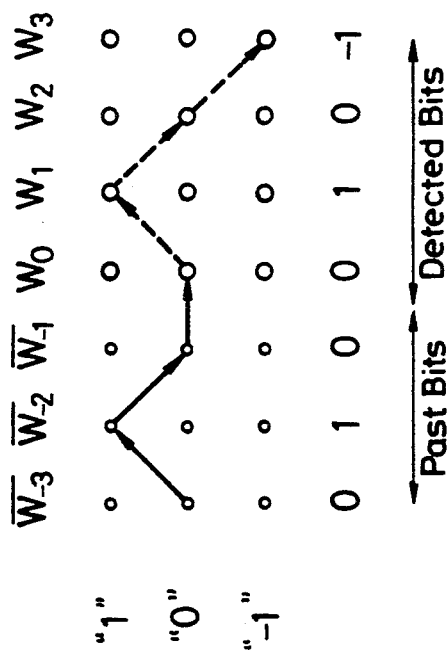
FIG. 10A is a state transition diagram to which reference will be made in explaining the operation of the present invention.
Figure 11:
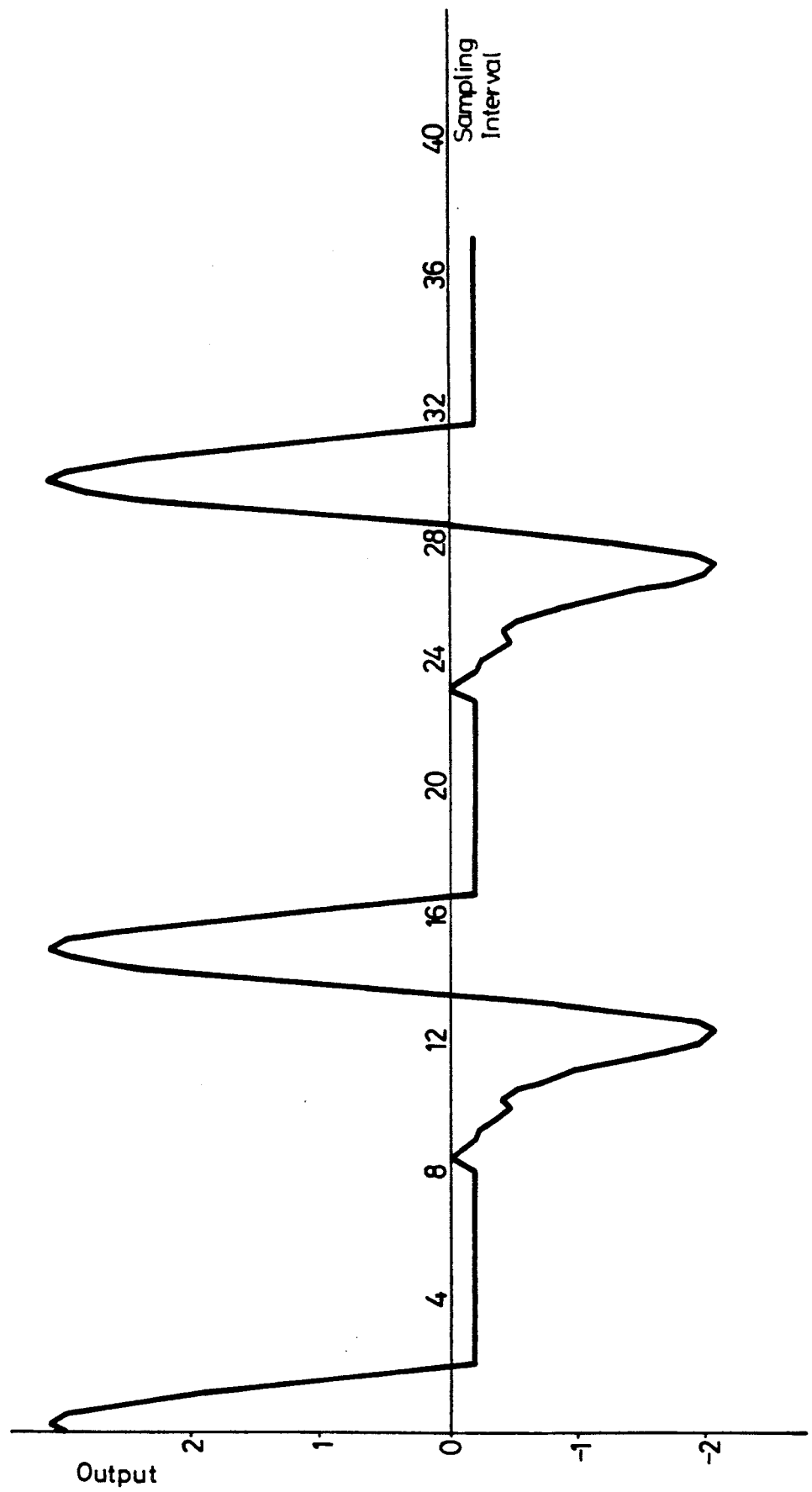
FIG. 11 is a schematic diagram showing the isolated waveform used in the present invention.

In the above-noted equation (2), W is the data series of, for example, three values, H is the isolated wave value series, and y is the input value series (reproduced output). Further, $\overline{W}_{-1}$ to $\overline{W}_{-3}$ are preceding data and $W_0$ to $W_3$ are the detecting data elements. More specifically, $\overline{W}_{-1}$ to $\overline{W}_{-3}$ are already the preceding bits as will be clear from FIG. 10A which illustrates ternary data series so that $\overline{W}_{-3}$ is, for example, "0", $\overline{W}_{-2}$ is "1" and that $\overline{W}_{-1}$ is "0". While, $W_0$ to $W_3$ are, on the other hand, not yet defined so that they have to be calculated by use of the equation (2). In other words, past data (past bits) from a memory (not shown) provided within the detecting circuit 11 are inserted into the $\overline{W}_{-1}$ to $\overline{W}_{-3}$ expressed by the equation (2); values of respective sampling values of the isolated waveform shown in FIG. 10B are read from the RAM 10 and are inserted into $H_0$ to $H_3$; and the value of the reproduced output from the A/D converting circuit 9 is inserted into the $Y_0$ to $Y_3$. Then, the values corresponding to the modulating code upon recording are inserted into $W_0$ to $W_3$ and the values of $W_0$ to $W_3$, when the value of waveform difference L becomes smallest, are employed as the target detection data, i.e., defined data. The broken line in FIG. 10A shows this state, in which $W_0$ is "0", $W_1$ is "1", $W_2$ is "0" and $W_3$ is "−1". These values are definite data.

The thus defined data (multi-value signal) is supplied to a demodulating circuit 12 and is then fed to an output terminal 13 as output data.

FIG. 9 is a block diagram showing an example of a practial circuit of the detecting circuit 11.

In FIG. 9, it will be seen that the input value series (reproduced output) Y from the A/D converting circuit 9 (see FIG. 8) is supplied to an input terminal 20. The input value series Y applied to the input terminal 20 is supplied to plus (+) terminals of a plurality of adders, for example, 16 adders $21_0$ to $21_{15}$. The isolated wave value H read from the RAM 10 (see FIG. 8) is supplied to an input terminal 22. The isolated wave value H applied to the input terminal 22 is supplied to a plurality of convolution calculators, for example, 16 convolution calculators $23_0$ to $23_{15}$. These 16 convolution calculators $23_0$ to $23_{15}$ are respectively supplied with past data W from memories (not shown) and the future data value series $W_0$ to $W_{15}$. The convolution calculators $23_0$ to $23_{15}$ perform convolution operations of *H to generate at their output sides calculated values $A_0$ to $A_{15}$. These values $A_0$ to $A_{15}$ are respectively supplied to minus $(-)$ terminals of the adders $21_0$ to $21_{15}$, whereby the above-mentioned equation (2) is performed. Thus, waveform differences $\iota$ are obtained.

The waveform differences $\iota$ are supplied to square circuits $24_0$ to $24_{15}$, whereby each absolute value is substantially calculated. Outputs $\iota^2$ of the square circuits $24_0$ to $24_{15}$ are supplied to a comparing circuit 25, in which the comparison of the minimum value of $\iota^2$ is effected. In that event, the minimum value of $\iota$ is substantially selected, and $W_i$ (one of $W_0$ to $W_{15}$) at that time is selected as the most likely series (detected data), which is fed to the output terminal 26.

Figure 12:
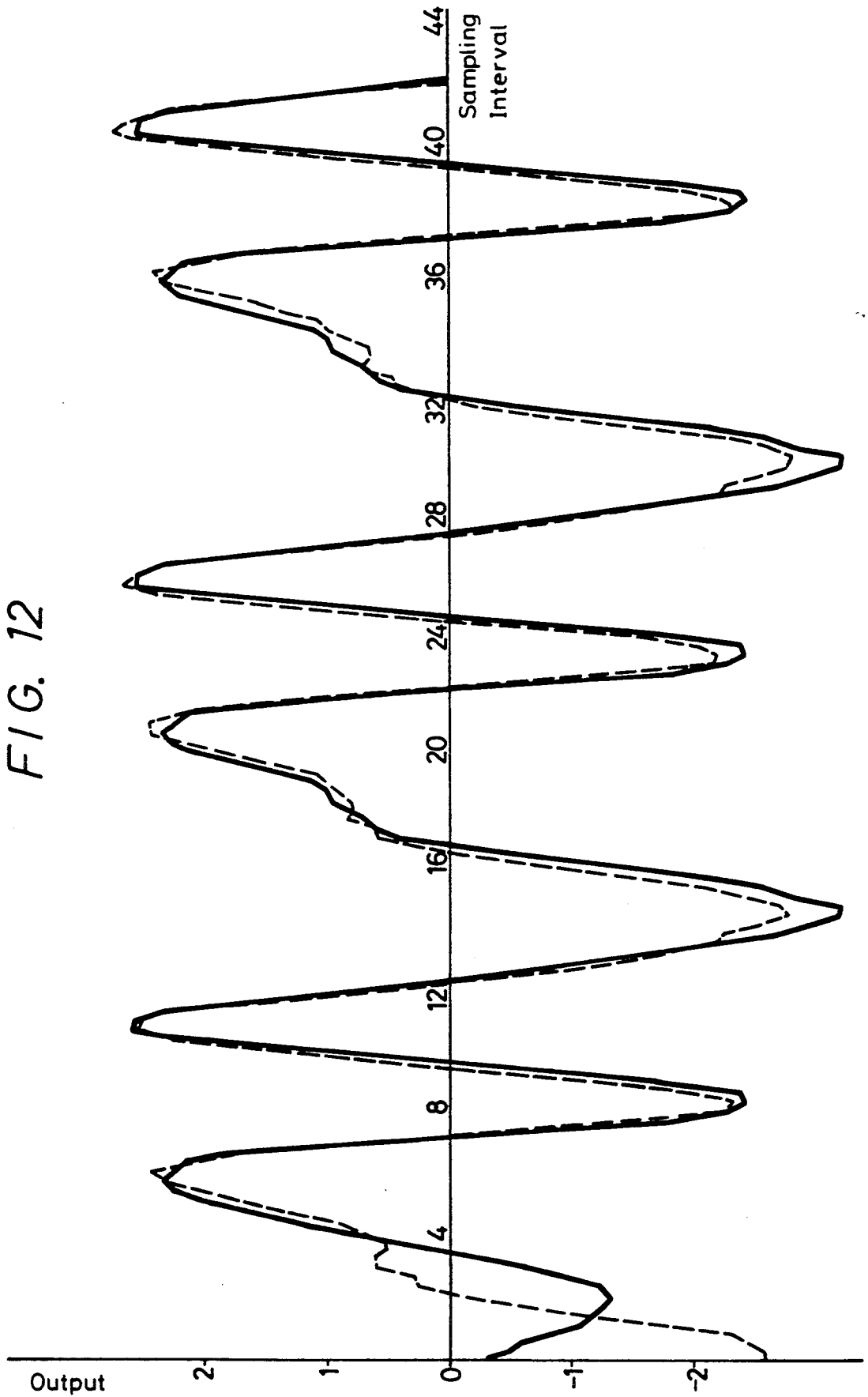
FIG. 12 is a graphical representation to which reference will be made in explaining the compared results of the calculated waveform and the reproduced output.

FIG. 12 shows the above-mentioned condition from a waveform standpoint.

In FIG. 12, a solid line represents a waveform which results from the calculations W * H by the convolution calculators $23_0$ to $23_{15}$, i.e., a waveform provided by overlapping the isolated waveforms. This waveform is obtained by the calculation of W * H according to the afore-mentioned equation (2). In FIG. 12, a broken line represents a waveform of the reproduced output y which is applied to the input terminal 20. Then, a value in the portion where a difference therebetween is smallest, i.e., in the portion in which the value of $\iota$ is smallest can be regarded as the most likely series, and this series is employed as the correct detected data. In this connection, this code is a reproduced waveform of 10100–1010–10–1010]. In FIG. 12, the solid line and the broken line in the leftmost portion are displaced because the overlapping of data is not a cyclic-type. While the combination of the longitudinal medium and the ring head is described in the above embodiment, the present invention is not limited thereto. The present invention can also be applied to a recording medium such as a vertical medium in which the orientation is different if a head is taken into consideration.

As described above, according to this embodiment, even if the existing magnetic recording medium (magnetic tape, magnetic disc or the like) and the existing device (head) are employed without modification, then it can be expected that the packing linear density will be increased about two to three times that of the prior art. In that event, the dimension such as the track pitch and the like may not be changed. Further, if a recording medium and a device conforming to the system of the present invention is developed, then the packing linear density will be improved more.

The system of the present invention includes the prior-art recording system, whereby a digital signal, recorded according to the prior-art recording system, can be detected, thus making it possible to effect a so-called higher-bit conversion. Furthermore, a soft tape can be mass-produced by a contact printer similarly to the prior-art recording system.

As set out above, according to the above-mentioned embodiment of the present invention, digital data are recorded in the three kinds of regions including at least the region in which the magnetization direction is randomly presented, and upon reproduction, digital data are calculated by the use of the reproduced signal and the isolated waveform information, thereby obtaining the most likely data. The resultant most likely data is employed as the detected data. Therefore, as compared with the prior-art system, the packing linear density can be improved according to the above embodiment of the present invention. Thus, the efficiency of the whole system can be increased, and the system of the present invention can be made inexpensive.

Another embodiment of the present invention will now be described in detail with reference to FIGS. 13 to 20.

According to this embodiment, a data series is segmented in units of a plurality of bits. Assume that a modulation code length to be recorded is an L bit, then this L bit becomes a fundamental unit in the demodulating process. In the following explanation, L assumes the modulation code length, M assumes the number of patterns, $l\mu m$ assumes the length of the magnetic tape and which corresponds to the L bit, Dij assumes the pattern distance, and Dmin assumes the shortest pattern distance.

Figure 13A:
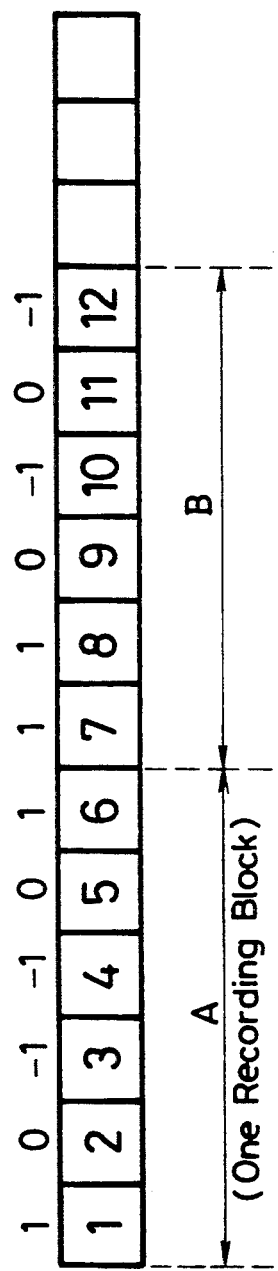
FIGS. 13A to 13C are schematic representations to which reference will be made in explaining a relationship among the modulated signal, the recorded signal and the reproduced waveform according to the present invention.
Figure 13B:
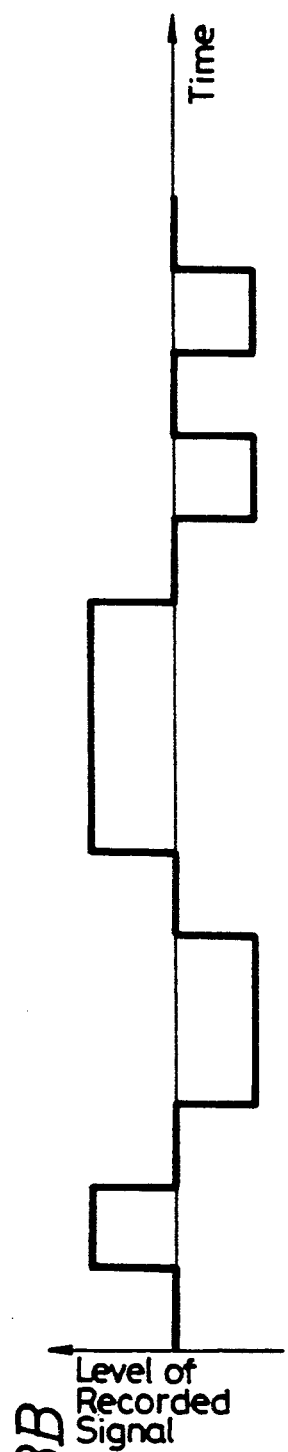
Figure 13C:
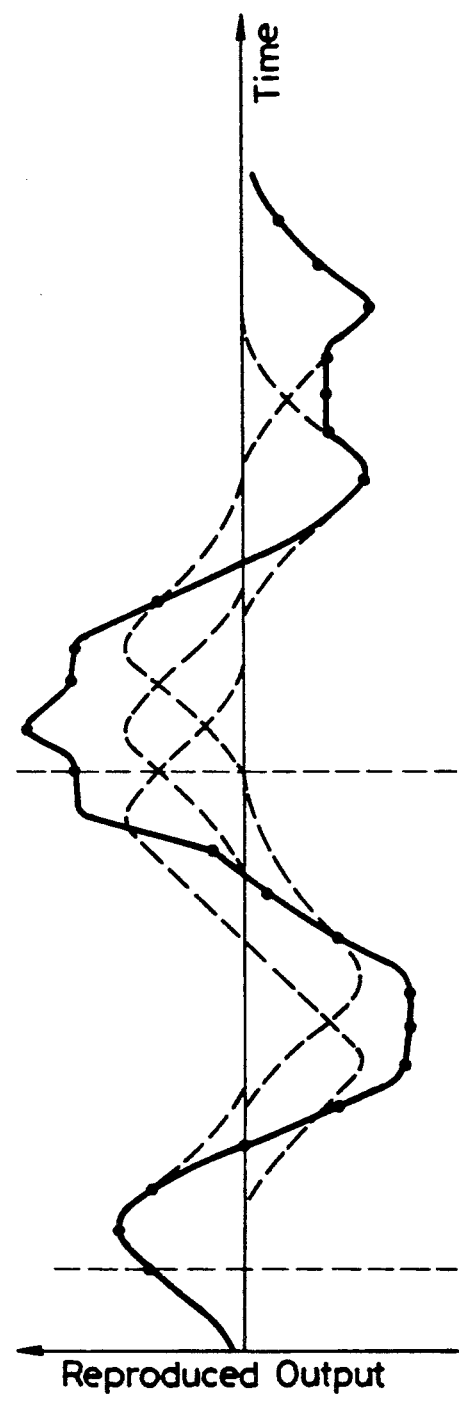

A relationship among the modulation code, the recorded signal and the reproduced waveform used in this embodiment is represented in FIGS. 13A to 13C. FIG. 13A illustrates the modulation code in which L=6 and M=8. FIG. 13A shows two patterns A and B of 8 patterns. The recorded signal for such modulation code is represented by a waveform which has a logic level of three values as shown in FIG. 13B.

FIG. 13C shows a reproduced output which results from integrating waveforms of signals reproduced from a magnetic medium. In FIG. 13C, a broken line shows each of the isolated waveforms, and a solid line shows a reproduced output which is provided by adding these isolated waveforms. The isolated waveform in this case will be explained as follows. Let us consider a case where a magnetization vector oriented in a certain direction is isolated in a region in which the magnetization directions are presented randomly. In this case, when the top and rear end portions of the magnetization vector pass the head gap, a current corresponding to the change of magnetization flows to the winding of the head, thereby making it possible to detect the existence and polarity of the magnetization vector. The reproduced waveform detected at that time is referred to as an isolated waveform and the isolated waveform can be regarded as a response waveform to a single magnetization oriented in a certain direction.

Figure 14:
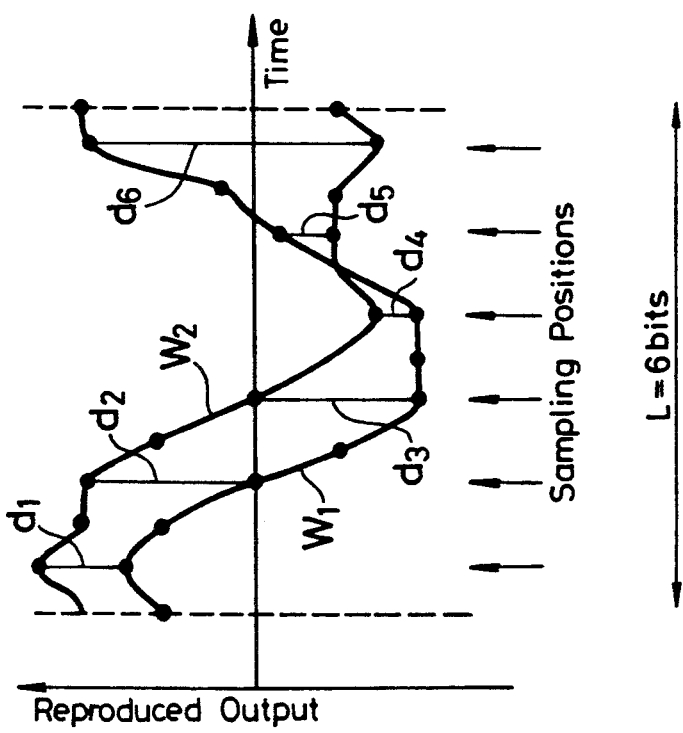
FIG. 14 is a schematic representation showing a distance between the patterns, and to which reference will be made in explaining the operation of the present invention.

FIG. 14 shows a distance between the patterns A and B. In FIG. 14, a waveform $W_1$ represents a reproduced output waveform of the pattern A, and a waveform $W_2$ represents a reproduced output waveform of the pattern B. Assuming that distances between both patterns in respective sampling positions are $d_1$ to $d_6$ in FIG. 14, then a distance D between the patterns A and B is expressed as $D=d_1+d_2+d_3+d_4+d_5+d_6$. Further, assuming that M is the number of patterns recorded in the length $l\mu m$ on the magnetic tape corresponding to the L bit on the magnetic medium, there exists the pattern distance of $(M-1)M/2$.

Figure 15:
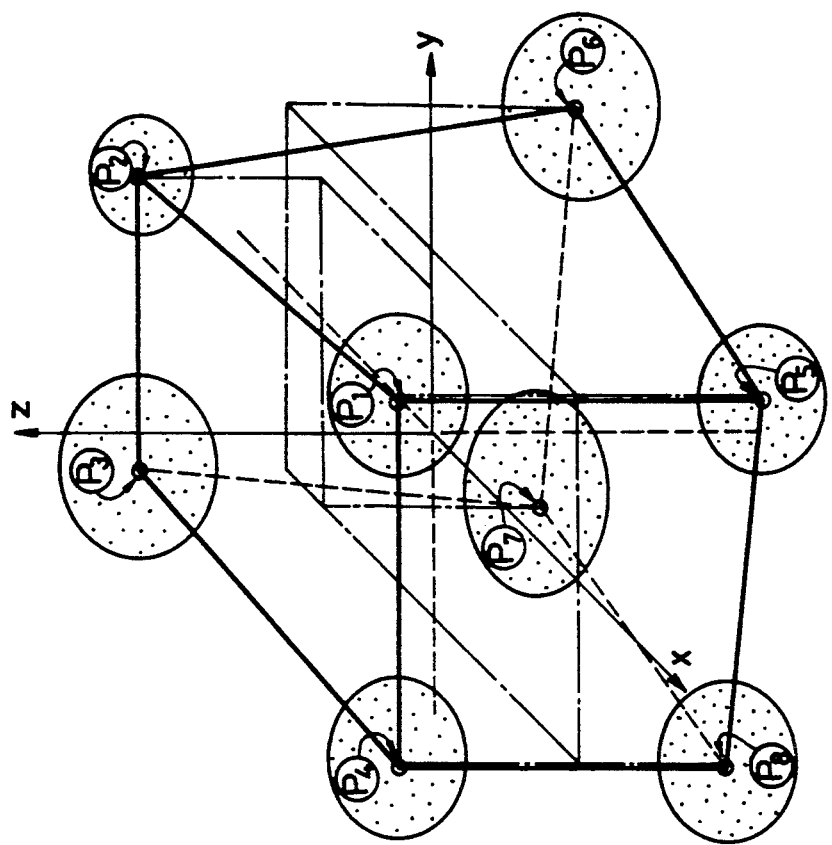
FIG. 15 is a schematic diagram showing the layout of patterns, and to which reference will be made in explaining the operation of the present invention.

FIG. 15 shows a pattern layout in which M=8 and L=3. From FIG. 15, it is clear that the magnetic medium keeps a perfect linear property. More specifically, let it be assumed that without indefinite elements, the respective patterns are located at positions $P_1$ to $P_8$ in FIG. 15. In practice, each of the patterns has a certain expanse due to indefinite elements such as a noise generated from the magnetic medium, non-linear property, system noise, jitter and the like. The expanse of each of the patterns is represented by an ellipse in FIG. 15. In FIG. 15, an x axis, a y axis and a z axis represent reproduced output levels at the respective sampling positions where L=3 presents three sampling positions.

A probability in which an error occurs in the reproduction is determined by an overlapping amount of indefinite element regions of a pattern to be detected and a pattern which has a minimum distance (Dmin) from the former pattern. As, for example, shown in FIG. 15, if a pattern to be detected is taken as $P_2$, then a pattern nearest to the pattern $P_2$ becomes $P_3$. Representing these indefinite element regions by broken lines in FIG. 16, it is to be noted that the overlapping area of these indefinite element regions, i.e., the hatched section is a portion in which an error occurs. If the overlapping portion does not exist, then no error occurs. In other words, in order to avoid the overlapping portion, Dmin>a+b must be established where a and b are the lower limit values. The magnitudes of the indefinite elements are not uniform because non-linear elements of the magnetic medium are different in each pattern. In the case of the modulation code in this embodiment, in order to form the modulation code, it is one of the most important points $$\sum_{ij}$$

Dij is maximized and that Dij is made uniform, i.e., Dmin is maximized.

In this embodiment, the required efficiency for the modulation code is as follows:

① The distance Dmin between the pattern and the nearest pattern must be maximized;
② The reproduced output must be increased;
③ The rewriting must be effected by the over-write operation;
④ Error propagation must not be made;
⑤ The modulation code must be a DC free code; and
⑥ Intersymbol interference must be produced in a linear fashion (i.e., indefinite elements, caused by the magnetic medium, must be decreased).

More specifically, the conditions ①, ② and ⑥ are those of the present invention obtained by improving the prior art, while the conditions ③, ④ and ⑤ are those which are generally used to make the code. In this case, the conditions ③ and ⑤ are not always required by some system.

As a concrete example, let us consider a case in which the modulation code takes three values and L=3 and M=8, in association with the efficiencies required of the above-mentioned modulation code. In this example, a magnetization $\overline{M}$ of a certain direction corresponds to a code "1", a magnetization $\overleftrightarrow{M}$ of opposite direction corresponds to a code "−1", and a random region $\overline{R}$ to a code "0", respectively.

With respect to the required efficiency ①, there are 27 modulation codes from 111 to −1−1−1, and 8 modulation codes are selected from 27 modulation codes. From a code standpoint, the maximum distance is represented as 111−(−1−1−1)=6. In order to maximize Dmin, the modulation codes must be selected with an equal interval of 3 to 4 modulation codes.

With respect to the required efficiency ②, the repetition of 1 and −1 must not be continued more than L, i.e., the repetition of 1 and −1 must be provided within three times. If the inversions $\overline{M}$ and $\overleftrightarrow{M}$ of the magnetization are repeatedly carried out, then this causes the output to be lowered as shown in FIG. 17. This is caused by the increase of losses by gap loss, recording demagnetization and self-demagnetization. In FIG. 17, a broken line indicates an isolated waveform, and a solid line indicates a reproduced output which is provided by adding the respective isolated waveforms. In FIG. 17, a relationship of detected amplitude S1=S2=S3=S4 is established.

The required efficiency ③ is associated with the required efficiency ⑥. If the inversion of magnetization is not effected properly, then an erase rate is lowered, and also non-linear property is increased by self-demagnetizing field and mutual action of magnetic particles in the magnetic medium.

With respect to the required efficiency ⑤, in case of the code of three values, a DC component is examined only by checking the sum of the codes. For example, when the codes are 1, 0, −1, 0, 1, 0, −1, 0, 1, 1, the sum of the codes is 2. Therefore, in that case, the DC component is produced in the + (plus) side. Accordingly, the sum may be 0 within the code block, and the sum within 2L may be 0 by the combination of the modulation codes. In order to satisfy the required efficiency ④, it is preferable that so much restrictions are not provided in the successive modulation codes upon recording.

It is to be understood from the foregoing that in this example, the following conclusions are made:

(A) $\overrightarrow{M}$ (or $\overleftarrow{M}$) must be continued within three times;
(B) 0 must continue within two times;
(C) $\overrightarrow{M}$ and $\overleftarrow{M}$ must be alternately repeated within L times; and
(D) DC component must become 0 within 2L (i.e., the number of $\overrightarrow{M}$ and $\overleftarrow{M}$ must becomes the same within 2L).

FIG. 18 shows an example of conversion codes (M=8 and L=3) which satisfy the above-mentioned conditions (A) to (D). Modulation codes of Nos. 1 and 8 and marked with * in FIG. 18 represent that the sum thereof becomes 0 within 2L (i.e., 6 bits) and that they become DC free codes. Accordingly, in that case, the above-mentioned two codes are alternately switched at every 1L. In other modulation codes, the sums thereof become 0 within 1L (3 bits), and they become DC free codes.

Figures 19, 20:
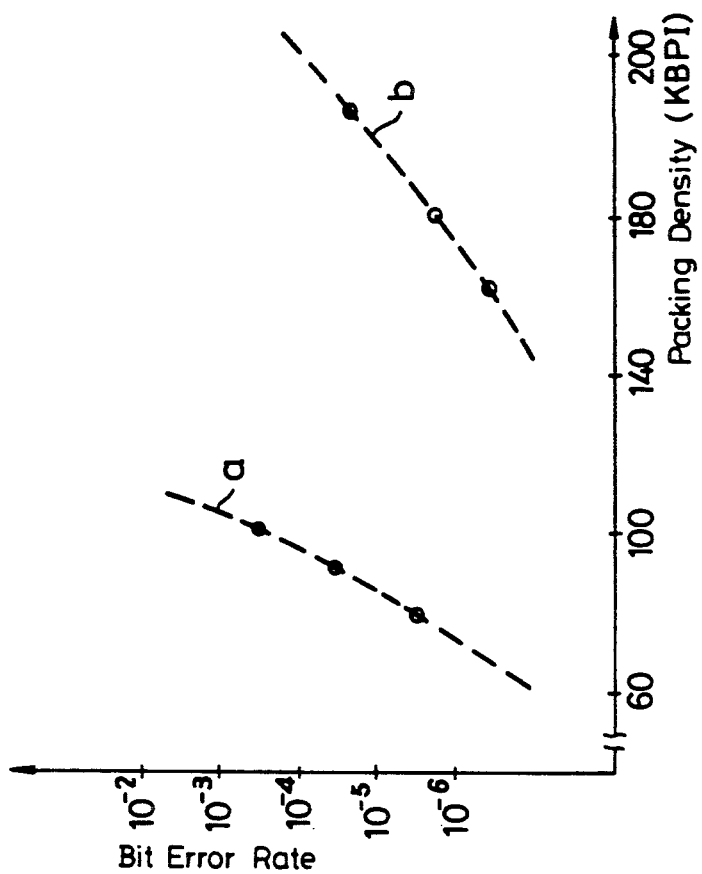

FIG. 19 shows an example of conversion codes where M=8 and L=9. In this case, the sums thereof become 0 within 1L (6 bits) and they therefore become DC free codes.

FIG. 20 is a graphical representation of a relationship between packing density and error rate, and illustrates them in a comparison of the present embodiment with the prior art. In FIG. 20, a curve a represents the prior art and a curve b represents the embodiment of the present invention. In the foregoing, a vapor-deposited tape is employed as the magnetic medium, and according to the prior art, 2-value bit detection is effected and 8/10-conversion is effected, while according to this embodiment, 3-value block detection is effected where M=8 and L=6. For example, when the bit error rate is $10^{-5}$, the packing density of the prior art is about 85 kBPI, whereas that of this embodiment is about 200 kBPI. Therefore, it is to be understood that the packing density can be considerably improved according to the present invention.

As described above, according to the present embodiment, there is provided the modulation method in which the error detection is not effected in units of one bit and the demodulation is effected in units of a plurality of bits (L). Also, the multi-value code is used in order that the pattern, provided by the successive (L) magnetizations, may correspond to the code and that the distance between the patterns may be increased. Therefore, it is possible to reduce the loss and non-linear property (in the intersymbol interference) inherent in the magnetic recording. Thus, the packing linear density can be improved.

While the ternary code is used as the multi-value code in the embodiment as described above, the multi-value code is not limited thereto, and other multi-value codes such as those exceeding the ternary code may be applied to the present invention.

As set out above, according to the present invention, the length in which the same code other than 0 is continued within a predetermined number, the code of 0 is continued within another predetermined number less than the former predetermined number and the reverse codes are alternately repeated is made within the L bit and a predetermined m-bit data is converted to a predetermined L-bit of multi-value. Therefore, the loss and non-linear property inherent in the magnetic recording can be reduced and the packing density can be increased. Further, according to the present invention, the circuits used in this method can be formed as the LSI finally, whereby the efficiency of the system can be increased, the reliability thereof can be increased, and the cost of the whole system for effecting the method of the invention can be reduced. In addition, the improvements of efficiency of the magnetic media and the device can be made more effectively.

In the prior art, a digital signal recorded on a magnetic recording medium is mainly a binary signal of "1" or "0". For example, according to the NRZ method, digital "1" corresponds to a high level and digital "0" corresponds to a low level, whereby data is detected by the level comparison. As an example of some special method, there is known such a method that the intersymbol interference is utilized only when the data has intersymbol interference (code correlation). For example, a partial response is one example thereof.

According to the former method, upon recording, a digital "1" or "0" corresponds to the existence or non-existence of the inversion of the magnetization in accordance with a predetermined coding method (NRZI method). Alternatively, a digital "1" or "0" corresponds to the polarity of magnetization (NRZ method). In other words, the recording and/or reproduction is performed on the assumption that there is no intersymbol interference inherent in the magnetic recording medium. To this end, the waveform equalization must be carried out as a pre-process for effecting the data detection, whereby the signal waveform must be reconverted to the signal waveform in the recording mode as much as possible. When the intersymbol interference becomes large to some extent, the waveform of a maximum repetitive signal (corresponding to the shortest wavelength) in which the reproduced output is small can not be equalized sufficiently so that data cannot be detected.

According to the latter method, the partial response method is frequently utilized because the hardware for effecting the partial response method is comparatively simple. According to the partial response method, a recording signal is precoded by mainly processing the same by a timebase, a delay and the like so as to provide the waveform of three-values. Upon decoding, the operation just opposite to the precoding is performed, i.e., this method is effected only in the presence of the code correlation.

However, any one of the above described prior-art methods utilizes only one portion of information amount which could be recorded on a recording medium. In order to increase the packing density, there is only one way of improving the efficiency of the recording medium and of increasing the sensitivity of the magnetic head. The efficiency thus improved is utilized to reduce the track pitch rather than to increase the linear density because the effective improvement of the packing density can be expected. Therefore, it is frequently observed that the recording and/or reproducing system is established by increasing the number of magnetic heads and by increasing the relative speed of the magnetic tape. Consequently, the overall arrangement of the system is made large-scaled, and the system becomes expensive, and the reliability of the system is degraded.

In view of the above-noted aspect, the data detecting method of the present invention can be enhanced in efficiency, in reliablity and the system can be made inexpensive by effectively utilizing digital signal processing techniques and by improving the linear density.

Fundamental units of magnetizations for recording information are represented by three conditions of FIG. 21. In FIG. 21, FIG. 21A shows a recorded signal, FIG. 21B shows a code corresponding to the recorded signal, FIG. 21C shows a magnetization state on the recording medium and which corresponds to the recorded signal, FIG. 21D shows a reproduced output corresponding to the recorded signal, and FIG. 21E shows a timing at which one portion of the reproduced output is sampled, respectively.

In this invention, let us consider magnetization vector regions shown by arrows a and b in FIG. 21C, and a random magnetization region, shown by a letter c, in which the magnetization direction is random. Note that the random magnetization region c does not always present a degaussed state. In the random magnetization region c in which the magnetization direction is random, the length of the region in which the magnetization is effected in one direction is less than half of the length of the head gap, and the region in which the magnetization direction is inverted occurs more than twice successively. Data are recorded in these regions a, b and c. More specifically, as shown in FIG. 21B, a digital "$-1$" is recorded in the magnetization vector region a, a digital "1" is recorded in the magnetization vector region b, and "0" is recorded in the random magnetization region c, correspondingly. In FIG. 21E, $t_1$ assumes a duration of an impulse response which is provided by a magnetic head having a certain head gap, $H = (H_0, H_1, H_2, H_3, H_4, H_5)$ assumes a numerical series (isolated wave) which is provided by sampling the reproduced output from the head 6 times.

FIG. 22 shows the condition of intersymbol interference in a case where the fundamental magnetization units of FIG. 21 are combined to provide fundamental blocks I to IV. The fundamental block II is affected by intersymbol interferences from the adjacent fundamental blocks I and III, whereas the fundamental block III is affected by intersymbol interferences from the adjacent fundamental blocks II and IV.

If the information is recorded in high density as shown in FIG. 22, then a waveform in which impulse responses are overlapped is obtained. Assuming that linearity is reserved, then the recorded code can be decoded by properly loosening the overlapped condition. If, however, the most likelihood decoding method is applied to the magnetization region having a length so that the intersymbol interference can be loosened sufficiently, the hardware necessary for the most likelihood decoding method is large-scaled, which can not be realized in practice. For this reason, according to the following embodiment of the invention, the most likelihood value is not detected by one process and is detected by a plurality of processes, thereby decoding the detected data.

Let us explain a most likelihood decoding method of a feedback-type in which data is decided by two processes.

The impulse response itself has the duration $t_1$ as shown in FIG. 22 so that the reproduced waveform obtained in the region of fundamental block II is affected by the preceding fundamental block I and the succeeding block III. Accordingly, in order to more accurately decode the data, the fundamental blocks I, II and III must be included in the detecting algorithm. In other words, since the fundamental block I is considered to be an already-known data, it is necessary to obtain the most likelihood value of code series concerning the fundamental blocks II and III. In this case, the duration $t_1$ is considered as a detecting fundamental time.

In this embodiment, it is intended to make the fundamental block as small as possible, i.e., to make the order of the matrix in the equation (2) small as described hereinbefore.

The way of how to decide the data will be explained with reference to FIGS. 23 to 26. In the following description, since variables W and L are employed, the meaning of the variables W and L and suffixes thereof will be explained first. W represents modulation data and the first digit from left of its suffix expresses the detection block (A or B), the second digit of the suffix expresses data 1 corresponding to the minimum value of L and data 2 corresponding to the next value of minimum value of L and the third digit of the suffix expresses the detection position (i). L expresses a likelihood value calculated by the detection equation (2). The first digit from left of its suffix expresses the detection block (A or B), the second digit of the suffix expresses the minimum value $-1$ of L and $-2$ of the next value of the minimum value of L and the third digit of the suffix expresses the detection position (i).

Figures 23, 24:
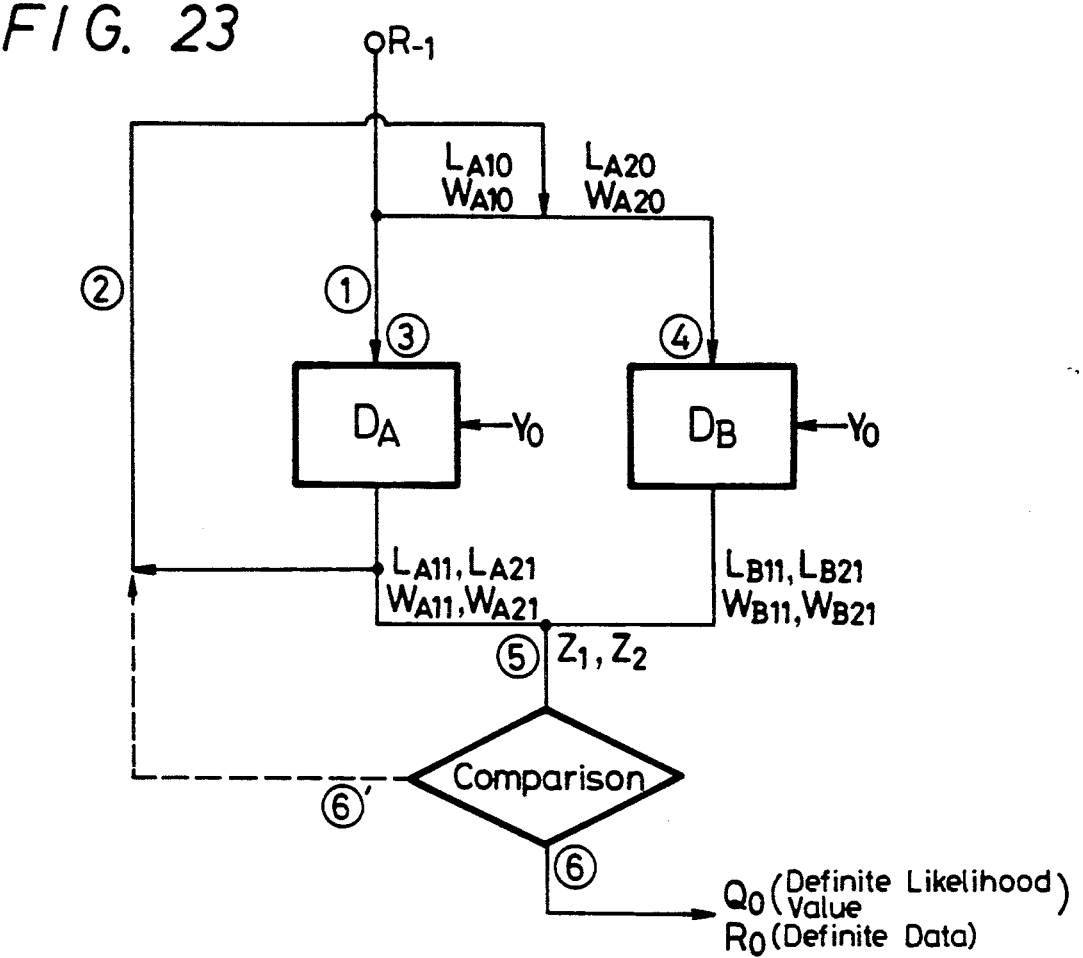
FIG. 23 is a flow chart to which reference will be made in explaining the steps included in deciding the reproduced data according to the present invention.
FIG. 24 is a table useful for explaining the flow chart of FIG. 23.

The flow of detection where $i=0$ will be described with reference to FIG. 23.

① The already-known modulation data $R_{-1}$ is obtained, and two modulation data $W_{A10}$, $W_{A20}$ each having highest likelihood and the likelihood values $L_{A10}$ and $L_{A20}$ are calculated in the detection block $D_A$.

② The two modulation data $W_{A10}$ and $W_{A20}$ and the likelihood values $L_{A10}$ and $L_{A20}$ are inputted to the detection blocks $D_A$ and $D_B$ through the feedback system. More specifically, the modulation data $\overline{W}_{A10}$ and the likelihood value $L_{A10}$ are inputted to the detection block $D_A$, whereas the modulation data $\overline{W}_{A20}$ and the likelihood value $L_{A20}$ are inputted to the detection block $D_B$.

③ The most likely value $L_{A11}$, and the corresponding modulation data $W_{A11}$, and next value $L_{A21}$ of the most likely value and the corresponding modulation data $W_{A21}$ are calculated from the detection block $D_A$.

④ The most likely value $L_{B11}$, and the corresponding modulation data $W_{B11}$, and the next value $L_{B21}$ of the most likely value and the corresponding modulation data $W_{B21}$ are calculated from the detection block $D_B$.

⑤ The sum of the likelihood values $L_{A10}$ and $L_{A11}$ is calculated and the thus obtained sum is used as $Z_1$ ($Z_1 = L_{A10} + L_{A11}$). Further, the sum of the likelihood values $L_{A20}$ and $L_{B11}$ is calculated and the calculated sum is used as $Z_2$ ($Z_2 = L_{A20} + L_{B11}$).

⑥ By comparing $Z_1$ and $Z_2$, decided values $Q_0$, $R_0$ and return values $\overline{Q}_0$, $\overline{R}_0$ are identified. Namely, when $Z_1 \leq Z_2$, the decided data is $W_{A10}$ and the decided likelihood value is $L_{A10}$, whereas the return data to be transmitted to the next detection block are $\overline{W}_{A11}$, $\overline{W}_{A21}$ and the return likelihood values are $L_{A11}$ and $L_{A21}$. When $Z_2 < Z_1$, the decided data is $W_{A20}$, and the decided likelihood value is $L_{A20}$, whereas the return data to be transmitted to the next detection block are $\overline{W}_{B11}$, $\overline{W}_{B21}$ and the return likelihood values are $L_{B11}$ and $L_{B21}$.

⑥' The return values $\overline{Q}_0$, $\overline{R}_0$ are returned to ①, thereby forming the feedback loop.

The flow of detection in a case where $i \geq 1$ will be described with reference to FIG. 25. This flow of detection in a case of $i \geq 1$ is the generalization of the flow of detection in a case where $i = 0$.

① Of the preceding return data $R_{i-1}$ and the preceding return likelihood value $\overline{Q}_{i-1}$, the modulation data $\overline{W}_{A1(i-1)}$ or $\overline{W}_{B1(i-1)}$) and the likelihood value $L_{A1(i-1)}$ (or $L_{B1(i-1)}$) are inputted to the detection block $D_A$, whereas the modulation data $\overline{W}_{A2(i-1)}$ (or $\overline{W}_{B2(i-1)}$) and the likelihood value $L_{A2(i-1)}$ (or $L_{B2(i-1)}$) are inputted to the detection block $D_B$.

② The modulation data $W_{A1i}$, $W_{A2i}$ each having higher likelihood value and the likelihood values $L_{A1i}$, $L_{A2i}$ are calculated from the detection block $D_A$.

③ The modulation data $W_{B1i}$, $W_{B2i}$ each having higher likelihood value and the likelihood values $L_{B1i}$, $L_{B2i}$ are calculated from the detection block $D_B$.

④ The sums between the present likelihood values and the preceding likelihood values are calculated:

$$Z_1 = L_{A1(i-1)} + L_{A1i}$$

$$Z_2 = L_{A2(i-1)} + L_{B1i}$$

Figures 25, 26:
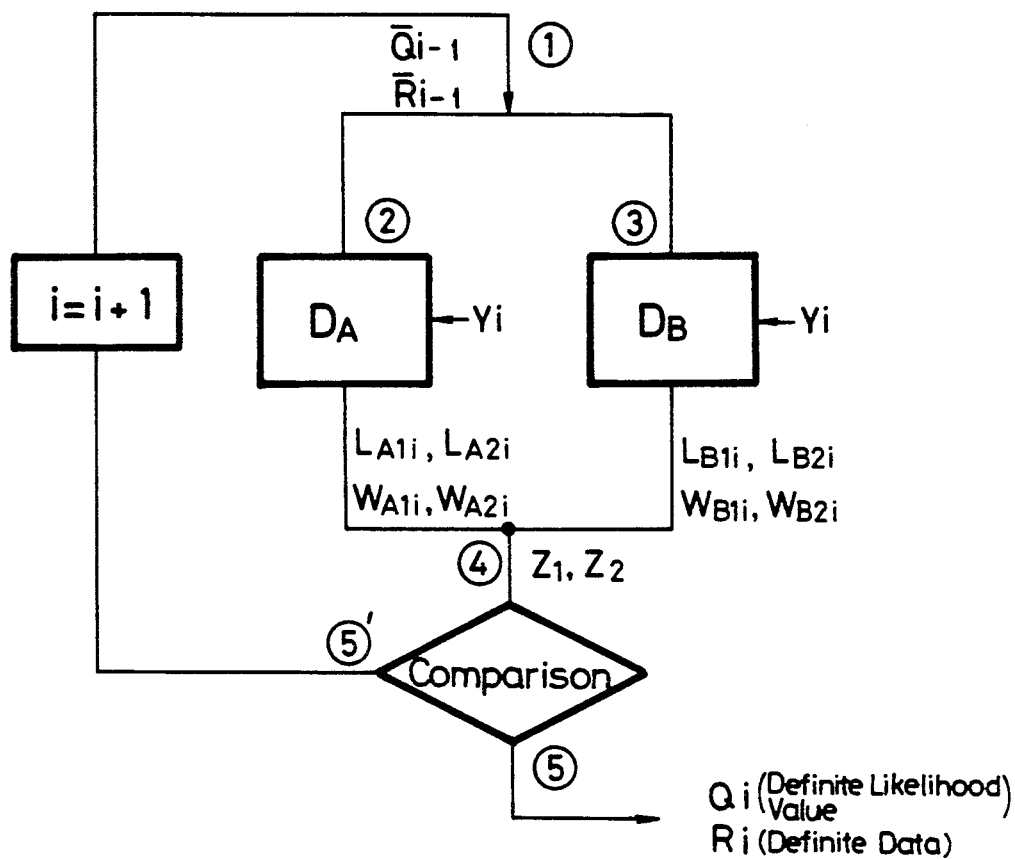
FIG. 25 is a flow chart to which reference will be made in explaining the steps included in deciding the reproduced data according to the present invention.
FIG. 26 is a table useful for explaining the flow chart of FIG. 25.

⑤ By comparing $Z_1$ and $Z_2$, decided values $Q_i$, $R_i$ and return values $\overline{Q}_i$, $\overline{R}_i$ as shown in FIG. 26 are identified. Namely, the data decided when $Z_1 < Z_2$ is $W_{A1(i-1)}$, and the decided likelihood value is $L_{A1(i-1)}$, whereas return data to be transmitted to the next detection block are $\overline{W}_{A1i}$ and $\overline{W}_{A2i}$ and the return likelihood values are $L_{A1i}$ and $L_{A2i}$. Further, data decided when $Z_2 < Z_1$ is $W_{A2(i-1)}$, and the decided likelihood value is $L_{A2(i-1)}$, whereas the return data to be transmitted to the next detection block are $\overline{W}_{B1i}$, $\overline{W}_{B2i}$ and the return likelihood values are $L_{B1i}$ and $L_{B2i}$.

⑤' The return values $\overline{Q}_i$, $\overline{R}_i$, i of each of which is incremented by "1", are returned to ①, and the operation proceeds to the next detection.

Figure 27:
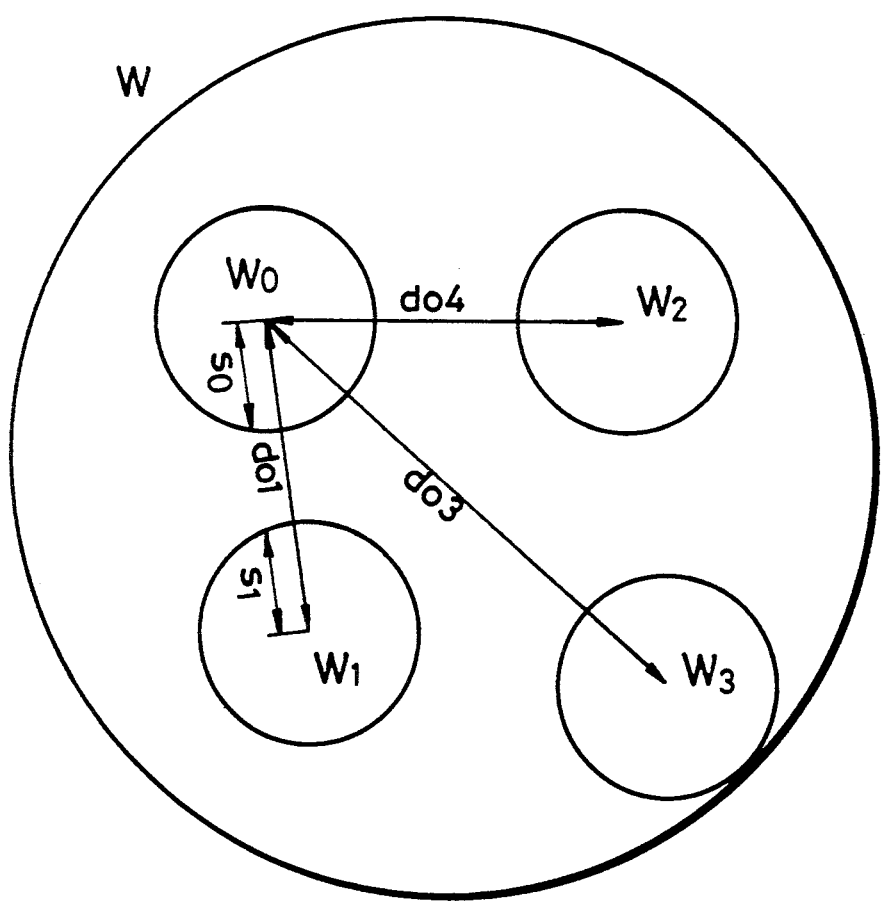
FIG. 27 is a schematic representation showing recorded patterns and distances between the recorded patterns according to the present invention.

FIG. 27 shows pattern conditions formed by the multi-value recording and the distance therebetween. In the code series to be recorded, as shown in FIG. 27, assuming that W is the set of all patterns that are formed by, for example, three values. Then, there exists patterns $W_0$ to $W_i$ (where i is the number of elements) as its elements. In this case, let it be assumed that W is formed for 6 bits. If the distance (likelihood difference) between the patterns is taken as d, the shortest distance becomes dmin. If the pattern is given a width of Si due to indefinite elements caused in the magnetic recording and/or reproducing, the pattern Wi is formed so as to satisfy the following equation (3)

$$d_{min} > 2S_i \qquad (3)$$

The width Si is considered to be determined by the non-linear property (M) of the magnetic particle, the system noise (N) and the jitter (J) from a time standpoint. In other words, Si is expressed as $Si=M+N+J$. Accordingly, the afore-mentioned detection equation (2) results in $= * - +Si$).

When the condition of the above described equation (3) is satisfied, in this embodiment, two regions (in the region of the fundamental block II of FIG. 22) are selected from Wi (the number i), and the processing proceeds to the region of the fundamental block III, wherein one of two regions is selected. According to this embodiment, as compared with the case where one detection fundamental block is employed, data can be detected more accurately, and the number of elements in the sets can be increased, thereby effecting the high density recording and/or reproducing.

As described above, according to this embodiment, in the method for decoding the multi-value (three-value, in particular) code in the digital magnetic recording, the detection width is selected to be the same as that of the impulse response time, and is not detected bit by bit. Rather, it is detected in units of several bits. Then, the most likelihood values are calculated stepwise on the basis of the impulse response information, whereby information of the intersymbol interference can be accurately detected by the smaller hardware.

As described above, according to the present invention, the plurality of detection data having higher likelihood values ar calculated from the plurality of indefinite modulation data, and the sum of the likelihood values of modulation data and the sum of likelihood values of the detection data are calculated. Then, on the basis of the results of sums, one detected data is selected from the modulated data and is decided as the detected data, which provides the enhanced efficiency of the overall system, the improved reliability and the inexpensive system.

Having described preferred embodiments of the invention in detail with reference to the accompanying drawings, it is to be understood that the invention is not limited to those precise embodiments and that many changes and modifications could be effected by one skilled in the art without departing from the spirit and scope of the invention as defined in the appended claims.

I claim as my invention:

1. A method for recording digital data comprising the steps of:
    arranging on a recording medium three kinds of regions, the first region is a magnetization region in which a magnetization is made in a certain direction, the second region is a magnetization region in which a magnetization is effected in an opposite direction to the first region, and the third region is a magnetization region in which a magnetization is effected randomly;
    recording digital data in correspondence with said three kinds of region; and
    further comprising the step of converting predetermined binary data of m bits of predetermined three-value data of L bits, wherein said converted three-value data has consecutive codes having a predetermined number of bits other than "0," a number of "0" bits less than said predetermined number, and a number less than L in which inverted bits are alternately repeated.

2. A method for reproducing digital data in which three regions, a magnetization region in which a magnetization is made in a certain direction, a magnetization region in which a magnetization is effected in an opposite direction to the former region, and a magnetization region in which a magnetization is effected randomly, are arranged on a recording medium and digital data recorded in correspondence with said three kinds of regions are reproduced, comprising the steps of:
    effecting a calculation by using a reproduced signal and an isolated waveform information form said recording medium;
    calculating anticipated data having a higher likelihood; and
    employing said anticipated data as detected data.

3. A method for reproducing digital data in which three regions, a magnetization region in which a magnetization is made in a certain direction, a magnetization region in which a magnetization is effected in an opposite direction to the former region, and a magnetization region in which a magnetization is effected randomly, are arranged on a recording medium and digital data recorded in correspondence with said three kinds of regions are reproduced, comprising the steps of:
    effecting a calculation by using a reproduced signal and an isolated waveform information form said recording medium;
    calculating anticipated data having a higher likelihood;
    employing said anticipated data as detected data; and further comprising the steps of calculating a plurality of detected data having higher likelihood values from a plurality of indefinite modulated data at detection and decided position of data, calculating the sum of likelihood value of said detected data and next detected data, which is obtained by anticipating said detected data at the detecting position of data next to the detecting position of said data, and specifying on the basis of said sum one of said plurality of detected data as said detected data at the detecting position.

4. A method for recording and reproducing digital data comprising the steps of:
    arranging on a recording medium five different regions comprised of
    (a) a first region in which magnetization is made in a certain direction with a first magnitude,
    (b) a second region in which magnetization is made in said certain direction with a second magnitude,
    (c) a third region in which magnetization is made randomly,
    (d) a fourth region in which magnetization is made in an opposite direction to said certain direction with said first magnitude, and
    (e) a fifth region in which magnetization is made in said opposite direction with said second magnitude;
    recording digital data in correspondence with said five different regions and reproducing said digital data according to said five different regions; and
    converting predetermined binary data of m bits to predetermined five-value data of L bits, wherein said converted five-value data has consecutive codes having a predetermined number of bits other than "0", a number of "0" bits less than said predetermined number, and a number less than L in which inverted bits are alternately repeated.

5. A method for reproducing digital data in which five regions, a magnetization region in which magnetization is made in a certain direction with a first magnitude, a magnetization region in which magnetization is made in said certain direction with a second magnitude, a magnetization region in which magnetization is made in an opposite direction to said first direction with said first magnitude, a magnetization region in which magnetization is made in said opposite direction with said second magnitude, and a magnetization region in which magnetization is effected randomly, are arranged on a recording medium and digital data recorded in correspondence with said five kinds of regions are reproduced, comprising the steps of:

effecting a calculation by using a reproduced signal and an isolated waveform information from said recording medium;

calculating anticipated data having a higher likelihood; and employing said anticipated data as detected data.

6. The method for reproducing digital data according to claim 5, further comprising the steps of calculating a plurality of detected data having higher likelihood values from a plurality of indefinite modulated data at detection and decided position of data, calculating the sum of likelihood value of said detected data and next detected data, which is obtained by anticipating said detected data at the detecting position of data next to the detecting position of said data, and specifying on the basis of said sum one of said plurality of detected data as said detected data at the detecting position.

* * * * *